United States Patent [19]
Helmke

[11] 3,771,250
[45] Nov. 13, 1973

[54] FISH HOOK SETTING DEVICE

[76] Inventor: Emil A. Helmke, 4018 Parrakeet St., Toledo, Ohio 43612

[22] Filed: July 31, 1972

[21] Appl. No.: 276,822

[52] U.S. Cl. ................................................. 43/15
[51] Int. Cl. .............................................. A01k 97/00
[58] Field of Search ................................... 43/15, 16

[56] References Cited
UNITED STATES PATENTS

| | | | |
|---|---|---|---|
| 1,614,931 | 1/1927 | Pennell | 43/15 |
| 2,726,470 | 12/1955 | Bass et al. | 43/15 |
| 2,755,589 | 7/1956 | Osborne | 43/15 |
| 2,876,578 | 3/1959 | Argenio | 43/15 |

*Primary Examiner*—Robert Peshock
*Assistant Examiner*—Daniel J. Leach
*Attorney*—Malcolm W. Fraser

[57] ABSTRACT

A fish hook setting device which conveniently can be interposed in the line between the fish hook and the fishing rod reel involving a toggle which, when in set position, is slightly over center. The toggle comprises a pair of levers with the end of one lever connected to a plunger slidable in a housing. A spring is disposed between the plunger and one end of the housing to bias the plunger toward the other end of the housing. A slight tug, as by a fish biting, operates to break the toggle and by the spring means impose a jerk or quick pull on the hook for capturing the fish.

4 Claims, 4 Drawing Figures

PATENTED NOV 13 1973 3,771,250

FISH HOOK SETTING DEVICE

SUMMARY OF THE INVENTION

The provision of a spring biased toggle in a fish hook setting device has an outstanding advantage of being positive and of an abrupt or instantaneous snap action. The toggle levers are so constructed and arranged that the toggle can be made or set by one hand almost with a single motion. This eliminates the arrangement of hook catches heretofore employed in this connection.

DESCRIPTION OF THE PREFERRED EMBODIMENT

Figure 2:
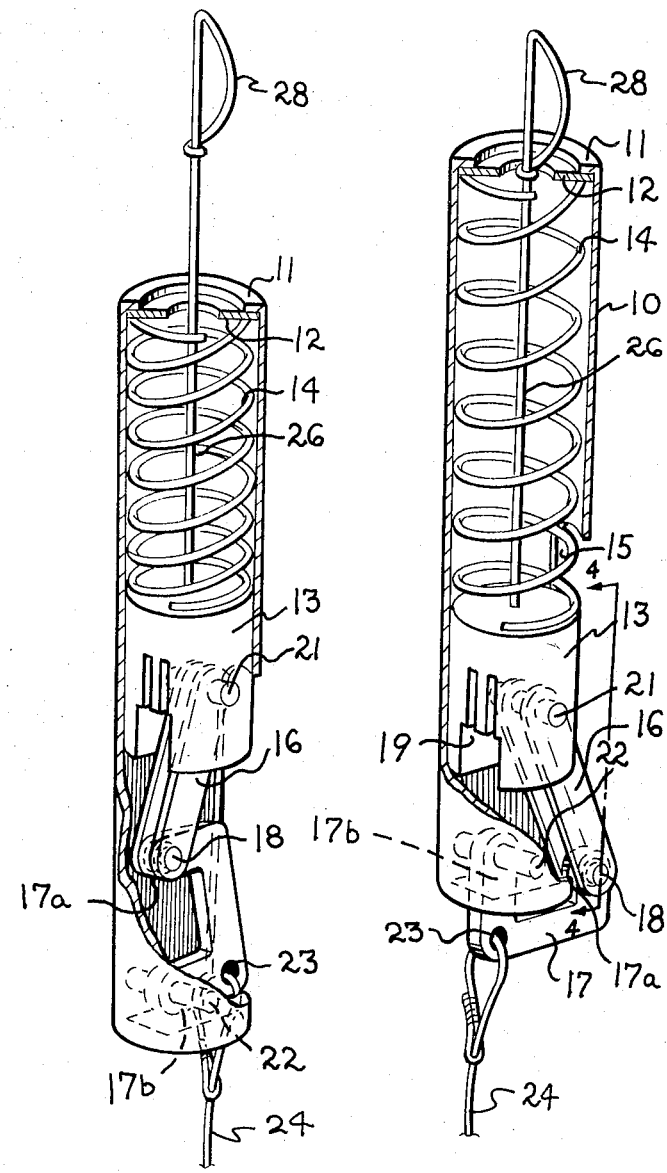
FIG. 2 is a view similar to FIG. 1, but showing the toggle in its set or unbroken position.
Figure 3:
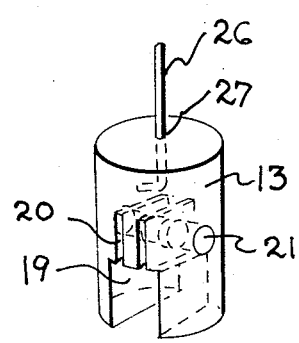
FIG. 3 is a top perspective view of the plunger and showing the manner in which the stainless steel wire is secured thereto.
Figure 4:
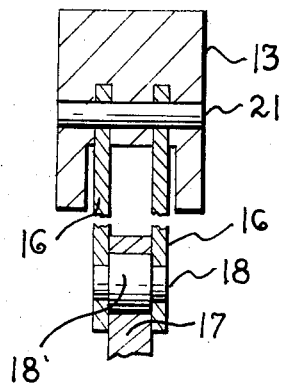
FIG. 4 is a sectional view on the line 4—4 of FIG. 1.

The illustrated embodiment of the invention comprises a fish hook setting device having a cylindrical metal tube or body 10, one edge portion of which is crimped over as indicated at 11 to retain a centrally apertured spring retaining washer 12 in place. Slideable within the body or barrel 10 is an elongate cylindrical plunger 13 which may be of a suitable plastic, such as nylon. Interposed within the body 10 between the inner end of the plunger and the washer 12 is a helically coiled spring 14.

In one side of the barrel is a slot or cut-away portion 15 to accommodate the action of a toggle mechanism. The toggle is made up of an upper lever 16 which consists of a pair of spaced arm members pivotally connected at their outer ends to a generally U-shaped lower toggle lever 17. The links of the toggle lever 16 straddle an end of the lever 17, and for connecting these parts a pinion rivet 18 has a larger diameter in the central portion 18' freely to fit the hole in the toggle lever 17 and to afford free rocking motion. The ends of the rivet 18 extends through holes in the ends of the lever link 16 and are upset.

In the lower end of the plunger 13 is a transversely cut-away portion 19 to afford free rocking movements of the toggle lever arms 16. In communication with the cut-away portion 19 is a pair of spaced slots 20 in which the end portions of the links of the arm 16 extend and where they rock upon a pinion pin 21 extending transversely through the plunger 13. It will be noticed that the lower toggle lever 17 is generally U-shaped with an arm 17a somewhat shorter than the other arm 17b, the shorter arm 17a being pivoted to the toggle lever links 16 and the longer arm 17b being pivoted to a pin 22 which extends transversely through the end portion of the tubular body 10.

At the juncture of the longer arm 17b of the toggle lever 17 and its cross arm is a hole 23 to accommodate the looped end of a leader 24 which at its free end carries a fish hook 25. A stainless steel wire 26 has one end suitably anchored in a hole 27 in the upper end of the plunger 13. The wire 26 extends through the coil spring 14 and the hole in the washer 12 to the outside.

On the outer end of the wire 26 is a suitably formed loop 28 to which is attached the line from the fishing rod reel, as will be readily understood.

Figure 1:
FIG. 1 is a perspective view in side elevation, portions being broken away for purposes of clarity, of a fish hook setting device, showing the same with the toggle links in tripped position.

In operation, after the hook 25 is suitably baited, the toggle is made or set by rocking the toggle arm 17 inwardly from the position shown in FIG. 1 to that shown in FIG. 2. In so doing, the coil spring 14 is placed under compression in response to the movement of the plunger 13 toward the retainer washer 12. When the fish nibbles or bites on the bail, creating a slight pressure, the toggle is broken and this causes the plunger 13 to move abruptly downward in response to the action of the coil spring 14. This abrupt yank sets the hook in the fish and enables it to be caught more readily. The action is such as to militate against the fish swallowing the hook. As a consequence, unwanted or undersized fish are not killed, and may be safely returned to the water.

The amount of throw of the toggle determines the amount of pull required to trip the device. One important feature is the ability of the toggle to be rocked by one hand to its set position. This can be accomplished by rocking the toggle lever 17 about its pivot pin 22 and at the same time holding the barrel or housing 10. Thus, a single hand can be used to set the toggle. It is further to be noted that after the device has been tripped, there is always tension on the toggle links 16 and 17 so that a fish which is hooked remains under spring tension.

What I claim is:

1. A fish hook setting device comprising
   a tubular housing,
   a plunger slideable in said housing,
   a spring seat at one end of said housing,
   a coil spring bearing at one end against said plunger and at the other end against said spring seat,
   a toggle mechanism having one lever means pivoted at its inner end to the lower end portion of said plunger,
   a second toggle lever pivoted at one end to the outer end of said first toggle lever means and pivoted at its other end to the adjacent end of said housing,
   an opening in the side of said housing to enable actuation of said toggle between a set and tripped positions,
   means enabling the attachment of a fish-hook carrying line to said second toggle lever, and
   a line having one end anchored to said plunger, and extending through said spring to the outside for connection of a fishing rod reel.

2. A device as claimed in claim 1, in which said second toggle lever is generally U-shaped with one arm shorter than the other and such arms connected by a transverse arm, the pivotal connection with said first toggle lever means being with the shorter arm, the longer arm being pivoted at its end to the end portion of the housing, and the attachment enabling means comprising a hole at the juncture of the long and transverse arms of said second toggle lever.

3. A device as claimed in claim 2, in which said first toggle arm comprises a pair of laterally spaced links straddling the end portion of said second toggle arm, and the pivotal connection between said toggle arms comprising a pinion rivet having reduced end portions extending through holes in said links, the central portion of said pinion rivet being of greater diameter than said end portions and of substantial length to fit freely in a hole in said shorter arm of said second toggle lever.

4. A device as claimed in claim 3, comprising a transverse cut-away portion in the plunger to afford swinging movement of said lever links, a pair of slots in the bottom of said cut-away portion to accommodate said links respectively, and a pivot pin extending transversely through said plunger and on which said links rock.

* * * * *